United States Patent
Cavanaugh (10) Patent No.: US 6,722,826 B2
(45) Date of Patent: Apr. 20, 2004

(54) INTERNAL CAVITY CUTTING TOOL WITH STABLE SUPPORT

(76) Inventor: Brian M. Cavanaugh, 20800 Marter, Grosse Pointe Woods, MI (US) 48236

(*) Notice: Subject to any disclaimer, the term of this patent is extended or adjusted under 35 U.S.C. 154(b) by 0 days.

(21) Appl. No.: 10/161,072

(22) Filed: Jun. 1, 2002

(65) Prior Publication Data

US 2003/0049086 A1 Mar. 13, 2003

Related U.S. Application Data

(60) Provisional application No. 60/318,559, filed on Sep. 11, 2001.

(51) Int. Cl.[7] .............................. B23C 3/00; B23C 5/00; B23B 41/00
(52) U.S. Cl. ........................ 409/143; 409/234; 408/93; 408/708
(58) Field of Search .................................. 409/143, 234, 409/140, 199, 138; 408/79–82, 83.5, 54, 203.5, 707, 708, 93, 211

(56) References Cited

U.S. PATENT DOCUMENTS

| | | |
|---|---|---|
| 663,445 A | 12/1900 | Muehlberg |
| 1,449,977 A | 3/1923 | Filson |
| 1,838,520 A | 12/1931 | Archer |
| 1,926,531 A | 9/1933 | Graham |

(List continued on next page.)

FOREIGN PATENT DOCUMENTS

| | | | | |
|---|---|---|---|---|
| DD | 0151705 A | * | 11/1981 | ............... 409/143 |
| DE | 151705 | | 5/1903 | |
| DE | 2902420 | | 7/1980 | |
| EP | 0123887 | | 11/1984 | |
| JP | 55-065012 | | 5/1980 | |
| JP | 59-214501 | | 12/1984 | |
| JP | 64-087109 | | 3/1989 | |

OTHER PUBLICATIONS

Nelson, Carl A., "Millwrights and Mechanics Guide", 1989, MacMilan, pp. 290–296, 298–318.*

*Primary Examiner*—Erica Cadugan
(74) *Attorney, Agent, or Firm*—Robert S. Nolan (57) ABSTRACT

An internal cavity cutting tool assembly includes a tool body, a tool hanger, and a bearing assembly. The tool hanger body has a through-bore that is adapted to receive the bearing assembly. The tool body has first and second body portions, each having an arbor bore, a cutting face having a plurality of indexable cutting inserts, and a bearing support surface. The bearing support surface of the second tool body portion is also received by end of the through-bore, such that the bearing support surfaces of the tool body portions oppose each other within tool hanger body. An arbor drive shaft and a support are operatively inserted though openings in a workpiece and through the arbor bore of the tool body. The arbor drive is retained in a milling device to operatively rotate the tool body assembly while precisely locating the tool hanger assembly, thereby sweeping the cutting inserts against the portions of the workpiece to be cut.

19 Claims, 9 Drawing Sheets

U.S. PATENT DOCUMENTS

| | | |
|---|---|---|
| 2,989,800 A | 6/1961 | Comly |
| 3,279,034 A | 10/1966 | Kaiser |
| 3,486,211 A | 12/1969 | Greenleaf |
| 3,551,978 A | 1/1971 | Berry, Jr. |
| 3,701,187 A | 10/1972 | Erkfritz |
| 4,061,076 A | 12/1977 | Robertson |
| 4,072,083 A | 2/1978 | Cesal |
| 4,252,480 A | 2/1981 | Mizuno et al. |
| 4,281,947 A * | 8/1981 | Marlowe .................... 408/93 |
| 4,294,565 A | 10/1981 | Erkfritz |
| 4,309,132 A | 1/1982 | Adamson et al. |
| 4,411,564 A | 10/1983 | Johnson |
| 4,512,689 A | 4/1985 | Bylund |
| 4,519,731 A | 5/1985 | Jester et al. |
| 4,525,110 A | 6/1985 | Stojanovski |
| 4,527,930 A | 7/1985 | Harroun |
| 4,551,043 A | 11/1985 | Kirchberger |
| 4,566,827 A | 1/1986 | Neumueller |
| 4,571,129 A * | 2/1986 | Strand ........................ 408/54 |
| 4,588,331 A | 5/1986 | Yoshinori |
| 4,618,296 A | 10/1986 | Allaire et al. |
| 4,662,254 A | 5/1987 | Noggle et al. |
| 4,692,070 A | 9/1987 | Shikata |
| 4,699,549 A | 10/1987 | Shimomura et al. |
| 4,729,697 A | 3/1988 | Lacey |
| 4,733,995 A | 3/1988 | Aebi |
| 4,743,144 A | 5/1988 | Shikata |
| 4,834,591 A | 5/1989 | Tsujimura et al. |
| 4,838,739 A | 6/1989 | Stashko |
| 4,898,500 A | 2/1990 | Nakamura et al. |
| 4,927,303 A | 5/1990 | Tsujimura et al. |
| 4,940,369 A | 7/1990 | Aebi et al. |
| 5,035,544 A | 7/1991 | Ikenaga et al. |
| 5,071,292 A | 12/1991 | Satran |
| 5,190,419 A | 3/1993 | Lindberg et al. |
| 5,221,162 A | 6/1993 | Okawa |
| 5,232,317 A | 8/1993 | Peuterbaugh |
| 5,294,219 A | 3/1994 | Shiratori et al. |
| 5,664,917 A * | 9/1997 | Judy ........................ 409/143 |
| 6,220,794 B1 | 4/2001 | Calamia et al. |
| 6,287,057 B1 * | 9/2001 | Kurz ........................ 408/708 |
| 6,536,997 B1 * | 3/2003 | Kress ........................ 408/708 |

* cited by examiner

INTERNAL CAVITY CUTTING TOOL WITH STABLE SUPPORT

CROSS-REFERENCE TO RELATED APPLICATION

The present invention claims the benefit of and priority to provisional patent application Ser. No. 60/318,559 filed Sep. 11, 2001, the disclosure of which is hereby incorporated herein by reference.

FIELD OF THE INVENTION

The present invention relates generally to cutting tool devices used in milling operations in internal cavities and, more specifically, to apparatuses for providing an internal cavity cutting tool with a stable support that is adapted to operatively engage a cutting device to an internal surface of a workpiece to perform milling operations in a very stable and precise manner within the workpiece.

BACKGROUND OF THE INVENTION

In the automotive industry the machining and the finishing of precision parts and assemblies have evolved into highly mechanized and highly accurate production processes. This evolution has been driven by the industry's attempts to create more accurately produced components with closer tolerances. These more accurately produced components are used in vehicle engines and drive train assemblies to increase vehicle fuel efficiency, to provide improved ride characteristics and to increase reliability. Specifically, today's vehicle drive trains benefit from having more precisely designed and produced transmissions, transfer cases and differentials. To create these components and their various sub-assemblies, automotive manufacturers and component production companies, which supply the manufacturers, rely on precision tooling in various milling, machining and finishing operations to create the required close tolerance surfaces. Not only must the precision tooling must be capable of providing accurate and repeatable fabrication of components in the mass production environment of the automotive industry, but also it must do so cost-effectively and at high rate of speed. The cutting elements of the precision tooling must also be capable of being accurately located against or relative to a workpiece that will become the finished component. This precision tooling often takes the form of various cutting devices that are a part of a multi-function milling machine or a multi-process production system that typically moves the workpieces through several stations, stages or steps, with the workpiece being securely held as the cutting devices are applied to it. Generally, a specialized machine fixture and/or workpiece registration devices control the accuracy of the placement of the workpiece in these machining operations. Also, the cutting device holders which move and/or rotate with the cutting tools have considerable structural strength in an effort to avoid compromising the desired accuracies by deflecting or shifting while performing milling or other cutting operations.

At times it is necessary, in order to machine and finish internal surfaces that will ultimately house or encompass bearings and shaft assemblies, to employ rotating cutting devices inside the workpiece. For example, in the production of carrier cases, which are used in differential assemblies for automotive axle and driveline applications, the cutting tool assemblies are inserted through openings in the carrier case workpiece for the machining of internal bearing and seat surfaces. It has long been known to provide internal cavity cutting tool assemblies that generally have a frame (typically referred to as a hanger), a rotating cutting tool (or body), and a removable interconnection means that provides a rotating drive force from the milling machine's motor or gearbox to the cutting tool.

To extend the working life of such cutting devices on milling machines, it is known to provide cutting tools with a plurality of indexable inserts for the cutting process. An insert is a hardened cutting bit, generally made of a metal alloy or treated metal, such as carbide steel, that is much harder than the workpiece to be machined. The cutting edges of the inserts are exposed to the metal of the workpiece and are rapidly rotated in a well-known manner in which the exposed cutting edge of the insert shears or shaves off the workpiece material down to the desired shape and dimensions. Making the insert indexable is accomplished by repeating the cutting geometry of the insert's cutting edge on more than one side or face of the insert. Additionally, the tool body, which holds and locates the inserts, has like recesses, often equilaterally spaced in and around the tool body, that are each formed to accept and retain an insert in a precise placement. In this manner, as the insert wears and dulls along one cutting edge, it can be turned, or indexed, in its locating recess to expose a fresh cutting edge. The indexing of the inserts can often be performed without removing the entire tool body and hanger from the milling machine. This indexing feature greatly increases the useful life of the cutting tool inserts before they must be replaced, which in helps decrease the milling machine's tool down time and overall operating costs.

The tool body or bodies which retain and precisely locate the cutting inserts are rotatably installed or set into the hanger. The hanger is formed from a generally rigid material, normally bronze. The hanger is normally bored to accept the tool body for rotation. Further, the bore in the hanger and the tool body are arranged so that when the hanger is inserted through a first opening in the workpiece, the cutting inserts in the tool body are generally aligned with the surface or surfaces to be cut. The center of the tool body in turn has a splined open bore so that a splined arbor shaft, attached to the milling machine, may then be inserted through a second opening in the workpiece and through the bore of the tool body. The arbor shaft engages the splines or teeth within the bore of the tool body so that, as the arbor shaft is rotated within the workpiece by the milling machine, the cutting inserts are also turned and applied to the surface to be cut, thereby performing the milling operation.

Forming specialized shapes in the interior portions of a workpiece, such as a spherical seat in a carrier case, are generally known in the art. U.S. Pat. No. 5,232,317 to Peuterbaugh and U.S. Pat. No. 6,220,794 to Calamia et al. are prior type. These cutting devices have rotatable tool bodies with multiple cutting inserts that are designed to be set on hangers. The hangers are moved into an interior portion of a workpiece. They are precisely located by the milling machine and then the arbor is inserted through the hanger and the workpiece, along the central axis of the tool body. The arbor provides the motive force to rotate the tool body, thereby allowing the cutting inserts to sweep an arc having a spherical, or semi-spherical cross-section within the workpiece and cut away material to create a semi-spherical seat. These devices require the use of cutting inserts that are formed so as to have a radial cutting edge. In this manner, as the insert is swept through the area to be machined, the radial cutting edge of the insert forms the radius of the spherical seat.

It is known in the art to use cutting tools to create flat perpendicular seats or seats having a flat surface which is offset from the perpendicular of the central axis. These tools typically use inserts with straight cutting edges and have the inserts oriented within the tool body at the desired angle of the seat to be formed. Quite often, to achieve the desired milling result, the milling process includes using both a rough tool and a finish tool on the same portion of the workpiece in a two-step process. The twostep process is sometimes necessary based on the amount of material to be removed, the hardness of the material of the workpiece and/or desired level of surface finish and/or machining accuracy.

Figures 1, 1B:
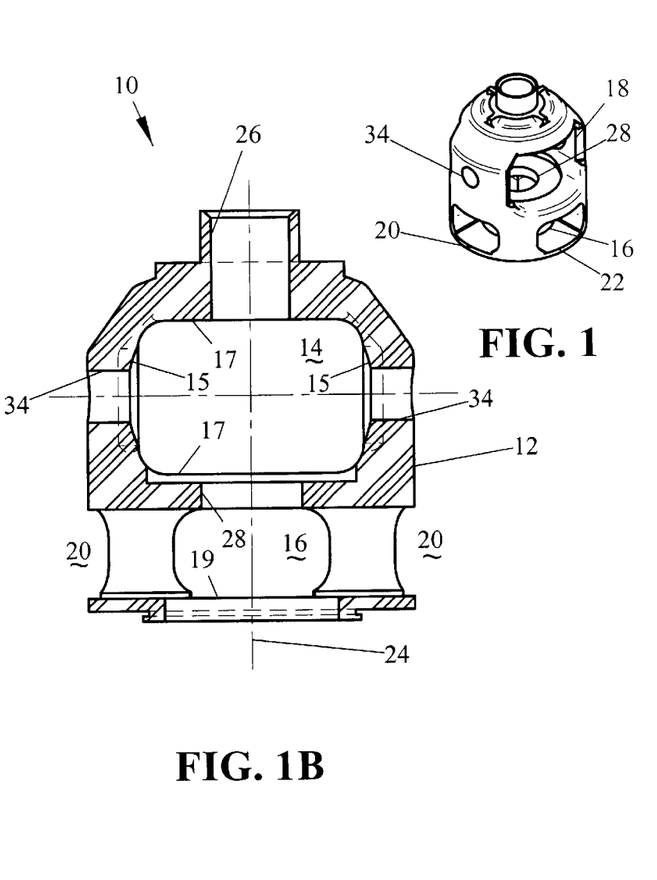
FIGS. 1, 1A and 1B are perspective, side elevational and side cross-sectional views depicting a typical differential carrier case workpiece to be machined by an internal cutting tool assembly of the present invention.
Figure 1A:
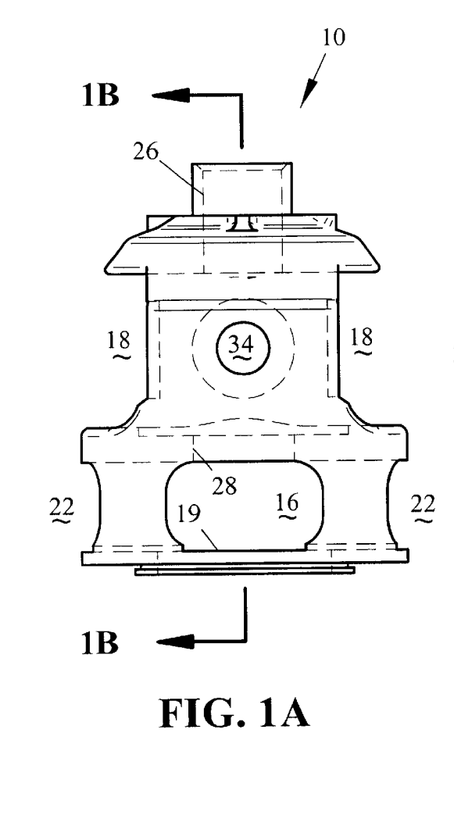

As shown in the Peuterbaugh '317 patent, the prior art spherical seat cutter 20a depicted in FIG. 1 cuts a spherical seat S on the interior of a workpiece such as a differential carrier case D which is fixedly held. The case D has diametrically aligned bores B around which the seats S are cut, as well as a large opening O at its top. The cutter 20a is supported for rotation about its central axis by a hanger 22a, which is mounted to the milling machine for vertical and horizontal movement. Cutter 20a includes a steel cutter body 26a formed with a reduced diameter section 28a at its rearward end, which is rotatably supported within bore 30a through the hanger 22a. A removable retainer plate 32a is coupled to the rearward end of the reduced diameter section 28a of the cutter body, which retains the cutter against axial movement relative to hanger 22a. An alternative embodiment suggests a double-sided tool body, as in the Calamia et al '794 patent, which would initially be engaged to cut one seat and be moved laterally on the rotatable drive arbor 34 to cut the opposing seat.

The drive arbor 34 projects through a central passage 36a extending through cutter 20a and is rotatably supported at opposite sides of the differential casing D by stationary bearing assemblies 38a and 40a. The arbor 34a is formed with splines, which slide between and engage complementary splines formed within the central passage 36a. The cutting of the seat in the workpiece D is performed by indexable cutting inserts 42a detachably mounted in the cutter. The inserts 42a include substantially parallel main surfaces 44a intersected by end surfaces 46a to form cutting edges 48a. The inserts 42a are mounted by fastener screws 50a in recesses formed in a front end surface F of the steel body 26a of the cutter 20a such that the main surfaces 44a lie in planes intersecting the front end surface F.

While capable of producing the desired results to some degree of accuracy, these and the other conventional internal cavity cutting tool designs currently in use have their limitations. For example, these conventional designs have difficulty maintaining a high level of accuracy. The hanger tool support member and steel cutter body assemblies mounted thereon of these conventional devices must endure the vibrational shock forces from the cutting of the workpieces and the load bearing of the tool as it is pressed into the cut. These forces, along with the frictional interaction of the steel tool body and the bronze hanger, result in mis-alignment and cutting inaccuracies to the work surface, especially over time. The tool support members are also susceptible to certain amounts of lateral deflection or distortion, which adds to inaccuracies in the work surface.

Additionally, the conventional devices also rely on the splined arbor to provide alignment of the tool body to the workpiece. However, spline drivers are, by nature, rather sloppy and do not work well as a precision locating device. Since they must slidingly engage and re-engage, splines are typically loose tolerance devices, and are generally only suitable for accuracies on the order of 5 thousandths of an inch. Thus, by supporting the internal cutting tool through the insertion of the splined arbor, these conventional internal cutting tools all have problems with rapid tool wear, tool chatter and mis-positioning.

Finally, conventional spline assemblies have spline teeth that are cut in a generally square manner. This, in conjunction with a free turning tool body, typically requires a human intervention to align the splines of the arbor and the tool body correctly as the tool is inserted in the workpiece. In some cases, the conventional cutting tool devices have a solenoid operated tool body brake or stop which holds the tool body in place once the spline arbor is withdrawn. In this manner, reengagement can be performed automatically, that is, without the machine operator having to physically align the spline teeth. This is of benefit for repetitive arbor engagements. However, this still requires initial operator alignment and such a tool body brake adds substantially to the complexity and cost of the tool.

Thus, there is a need for an internal cavity cutting tool assembly which overcomes the foregoing limitations of these conventional designs. In particular, there is a need for a cutting tool assembly that eliminates or at least dramatically reduces the inherent machining inaccuracies of the conventional designs using a splined arbor and conventional tool support. Also, it is desirable to extend the useful life of cutting tool inserts in order to lower production costs and reduce down time while reducing tool chatter and improving milling accuracies.

SUMMARY OF THE INVENTION

The present invention overcomes the disadvantages and drawbacks in the related art as an internal cavity cutting tool, which includes a rigid tool hanger assembly providing precision locating of the cutting tool within the workpiece. The present invention provides an internal cavity cutting tool assembly including a tool hanger assembly with a tool hanger body, a bearing assembly, and a bearing retainer plate. The tool hanger body is defined by a general "L" shape having an elongated leg and a long and further defined by a first surface and a second surface along the elongated leg. The elongated leg further has a through-bore disposed through a first and second surface, the through-bore further having a bearing seat that is adapted to receive the bearing assembly. The tool hanger body is adapted to receive the bearing retainer plate, thereby retaining the bearing assembly within the through-bore of tool hanger body.

Also included is a tool body assembly having a first or upper tool body portion and a second lower tool body portion. Each of the tool body portions have a splined arbor bore, a cutting face having a plurality of insert pockets, a plurality of cutting inserts, and a stepped radial portion defined by a bearing support surface. The bearing support surface of the first tool body portion is adapted to be received by the end of the through-bore in the first surface of the tool hanger body and the bearing support surface of the second tool body portion is adapted to be received by end of the through-bore in the second surface of tool hanger body, such that the bearing support surfaces of the tool body portions oppose each other within the through-bore of the tool hanger body, each of the plurality of insert pockets disposed within the tool body portions is adapted to receive one of the plurality of cutting inserts.

A splined arbor drive assembly having a splined arbor drive shaft and an arbor support is also included. The splined arbor drive shaft is operatively inserted though openings in a workpiece and through the splined arbor bore of the tool body portions into the arbor support. The splined arbor drive shaft and the arbor support are adapted to be retained in a milling device to operatively rotate the splined arbor drive assembly and the tool body assembly while precisely locating the tool hanger assembly, thereby sweeping the cutting inserts disposed in the tool body portions against the portions of the workpiece to be cut.

BRIEF DESCRIPTION OF THE DRAWINGS

Other advantages of the invention will be readily appreciated, as the same becomes better understood by reference to the following detailed description when considered in connection with the accompanying drawings, wherein.

DETAILED DESCRIPTION OF THE PREFERRED EMBODIMENTS

A conventional differential carrier case, which is to be utilized in a higher automotive assembly and requires at least one milling procedure to be performed through the use of the present invention, is schematically illustrated in FIG. 1 and generally indicated at 10. The differential carrier case 10 is a generally hollow, one-piece metal alloy unit having a main body 12, and a first or upper internal cavity 14 and a second or lower internal cavity 16, separated by an inner cavity wall 30. The main body 12 is formed by any suitable known casting method and includes access openings 18, 20 and 22 along the sides of the main body 12. The case 10 has various size bore openings formed in or cut along the main body central axis 24. Main body first bore opening 26, atop the main body 12, is machined, in a known manner, through to the first internal cavity 14 and is finished, in another known manner, to accept a pinion shaft (not shown). When the carrier case is later assembled, access from the upper internal cavity 14 to the lower internal cavity 16 will be required, and as such, an inner body bore opening 28 is cut through the inner cavity wall 30. Finally, a main body lower bore opening 32 is machined, in a known manner, through the lower end of main body 12.

Further bore openings are cut through the sidewalls of the main body 12. A gear pinion shaft (not shown) will later be installed laterally across the main body 12, which explains the need for the main body side bore openings 34. To provide the proper bearing surfaces and seats within the internal cavities 14 and 16 of the main body 12 of the differential carrier case 10, the cast material in the interior of the main body 12 surrounding the bore openings 26, 28, 32 and 34 must be machined down to the desired dimensions. For example, spherical seats 15 and square seats 17 and 19 must be machined into the internal surfaces of workpiece 10. It will be appreciated that the schematically illustrated differential carrier case of FIG. 1 is not complete and is not part of the present invention, but is shown for general reference, so that the cutting tool assembly of the present invention may be better understood.

Figure 2:
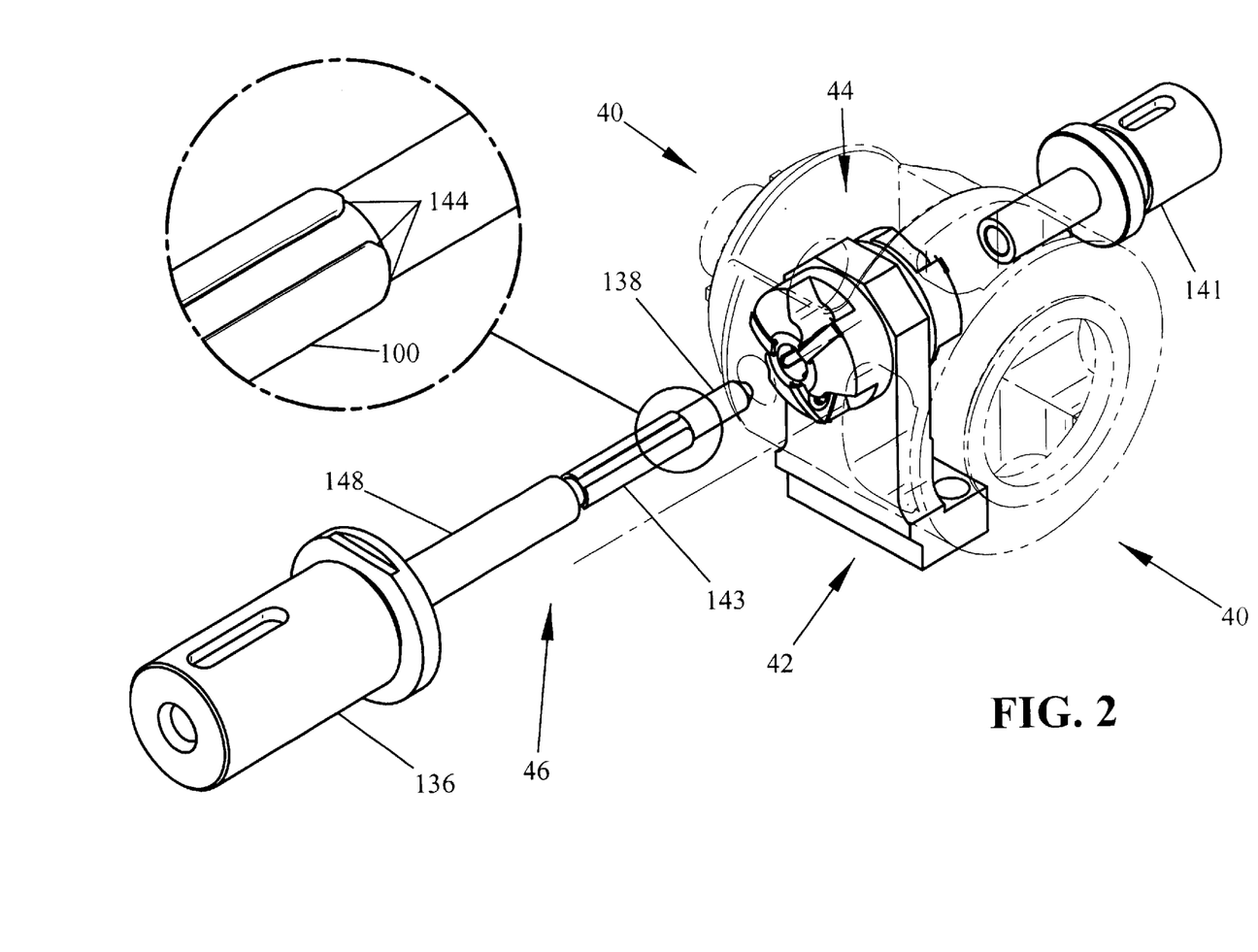
FIG. 2 is an exploded view of an internal cutting tool assembly of the present invention having a tool hanger that supports a precision ball bearing assembly, a rotatable tool body having first and second tool body halves each equipped with indexable inserts and adapted for cutting spherical seats in two different locations within a workpiece, and a spline driver arrangement for rotatably driving the tool body as it is supported by the ball bearing assembly and hanger tool within the workpiece.

FIG. 2 shows the internal cavity cutting tool assembly of the present invention, which is generally indicated as 40, where like numerals are employed to designate like structures throughout the figures. The assembly includes a tool hanger, generally indicated as 42, a tool body assembly, generally indicated as 44, and a splined arbor drive assembly, generally indicated as 46.

Figure 3:
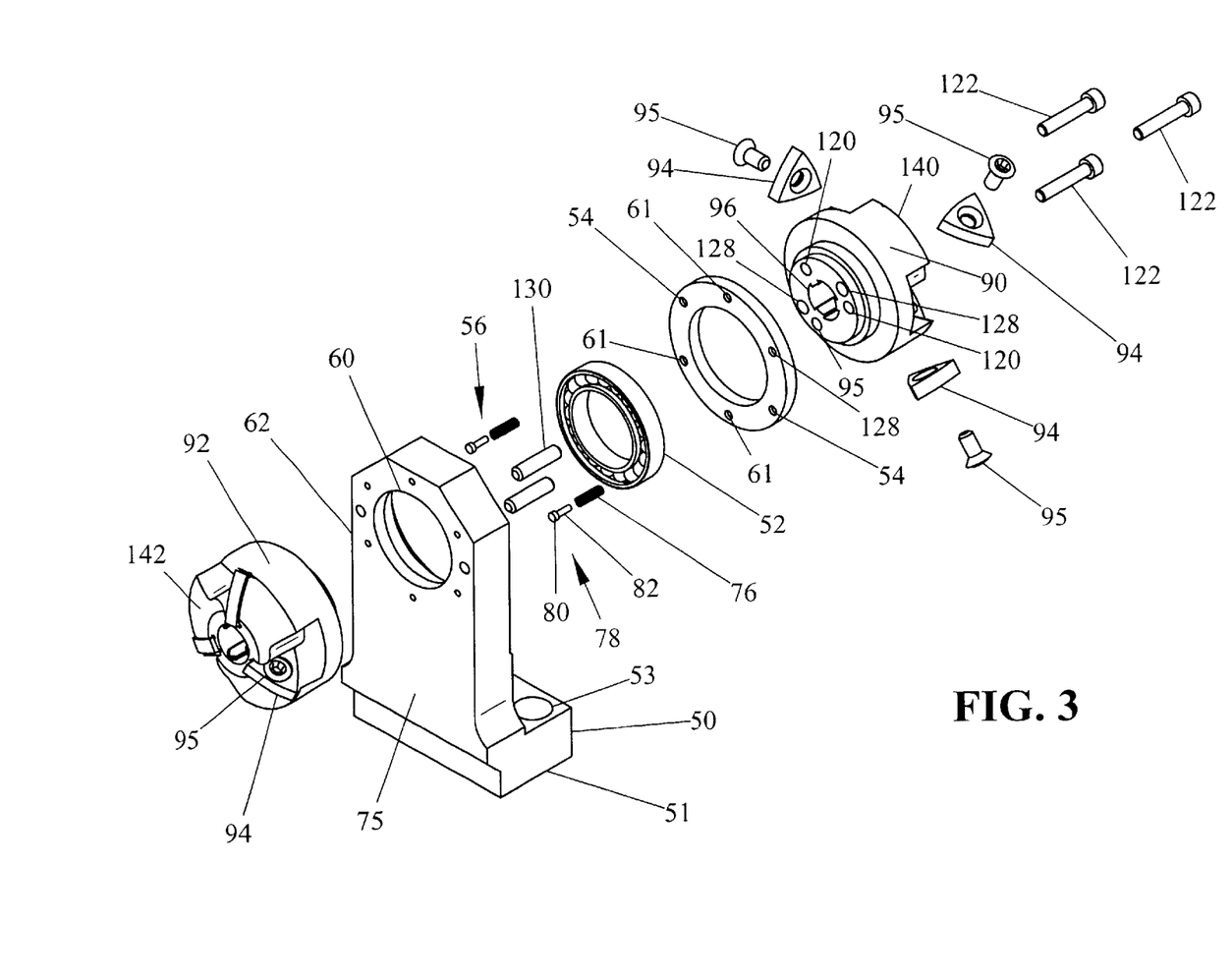
FIG. 3 is an exploded perspective view of the tool hanger and tool body of FIG. 2 internal cutting tool assembly of the present invention.

As shown in FIG. 3, the tool hanger 42 includes a tool hanger body 50, a bearing assembly 52, a bearing retainer plate 54, and a spring plunger assembly 56. The bearing assembly 52 is of a known, commercially available precision sealed ball bearing assembly of the type having an outer race 68 and an inner race 70 operatively separated by a plurality of captured ball bearings 69. The applicable bearing structure is sometimes referred to as a "deep groove" precision ball bearing. One suitable type of bearing assembly for use in the preferred embodiment, and as depicted, are any one of a group of precision sealing bearings produced by the NSK Corporation, which are referred to as NSK 6800 and 7000 series bearings.

In the preferred embodiments, a tool hanger 42 of high rigidity is desired, such that the hanger body 50 is preferably made out of a 4140 or 4150 type, pre-heat treated steel. It should be appreciated by those of ordinary skill in the art that comparable metallic compounds having high rigidity, such as an 8120 steel alloy, for example, may be employed without departing from the scope or spirit of the invention. The tool hanger body 50 is shown constructed in a general "L" shape, having two legs set at a right angle. As will be discussed later, other shapes and styles of tool hanger bodies may also be utilized. The tool hanger body 50 has a short leg 51 with a plurality of mounting holes 53 bored there through in a pattern which corresponds to the required mounting pattern of the milling machine. The short leg 51 of the tool hanger body 50 also has a locating-pin hole 55 which is used to receive a locating pin (not shown) from the milling machine. The internal cavity cutting tool 40 is thereby operatively mounted to, and assured an accurate placement upon, the milling machine by the use of these mounting holes 53 and locating pin hole 55.

Figure 4:
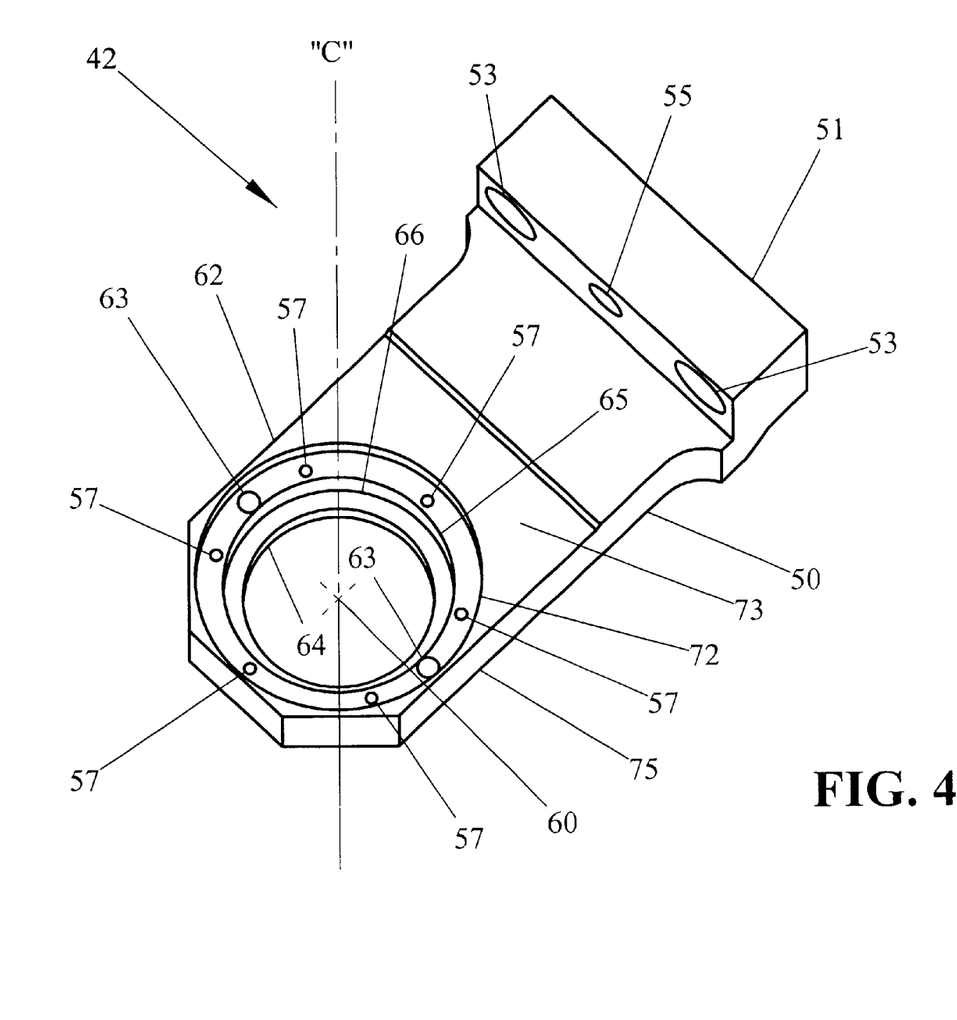
FIG. 4 is an oblique top view of the tool hanger of the FIG. 2 internal cutting tool assembly of the present invention.

The tool hanger body 50, as shown in FIG. 4, further includes an elongated leg 62 with a first surface 73 and a second surface 75 such that a through-bore 60 is cut through the elongated leg from the first surface 73 to the second surface 75 along an axis "C". The through-bore 60 of the tool hanger body 50 preferably includes three coaxial and successively larger diameter bores or openings. As shown in greater detail in FIGS. 5 and 5A, the lower, or first, diameter bore 64 rotatively accepts one portion of the tool body assembly 44, which will be discussed in greater detail below. The middle, or second, diameter bore 65, being larger than the lower diameter bore 64, forms a bearing seat 66 for the bearing assembly 52. The middle diameter bore 65, and thereby the bearing seat 66, is cut to a depth "A" (FIG. 5A) in the tool hanger body 50. The middle diameter bore 65 is of a dimension that allows a close tolerance fit to the outside diameter of the outer race 68 of the bearing assembly 52. In this manner, the bearing assembly 52 is operatively fit into the middle diameter bore 65 of the through-bore 60 such that the outer race 68 of the bearing assembly 52 rests on the bearing seat 66 while the inner race 70 of the bearing assembly overhangs into the open area created by the lower diameter bore 64. The upper diameter bore 72 of through-bore 60 is larger than the bearing assembly 52 and is cut to a depth of "B" in the tool hanger body 50. The upper diameter bore 72 is of a dimension that accepts the bearing retainer plate 54.

The bearing retainer plate 54 is in the form of an annular ring having an outer diameter greater than that of the bearing assembly 52 and an inner diameter that is greater than the diameter of the inner race, but less than the diameter of the outer race 68 of the bearing assembly 52. In this manner, when the bearing retainer plate 54 is placed within the upper diameter bore 72, over the bearing assembly 52, the outer race 68 of the bearing assembly 52 is retained within the tool hanger body 50, but the inner race 70 remains unrestrained and is free to rotate within the through-bore 60. Additionally, depth "B" is cut to extend in depth slightly below the top edge of the bearing assembly 52 when installed, such that, as the bearing retainer plate 54 is placed within the upper diameter bore 72, over the bearing assembly 52, it clampingly engages the outer race 68 to the tool hanger body 50, thereby securing the bearing assembly 52 against the bearing seat 66.

Specifically, as best shown in FIG. 4, the tool hanger body 50, within the upper diameter bore 72, has a plurality of retainer plate holes 57 bored and tapped parallel to the central axis "C", to operatively receive a plurality of plate cap screws 59 that are operatively engaged through corresponding countersunk plate holes 61 in the bearing retainer plate 54. In this manner, the bearing retainer plate 54 is operatively fit within the upper diameter bore 72 of the through-bore 60 and is secured with the plurality of plate cap screws 59, such that the bearing retainer plate 54 operatively engages the outer race 68 of the bearing assembly 52 and retains it against the bearing seat 66. The bearing retainer plate 54 correspondingly has a thickness of "B" (FIG. 5A), which places its upper face flush with the first surface 73 of the elongated leg 62 of the tool hanger body 50.

Figure 5:
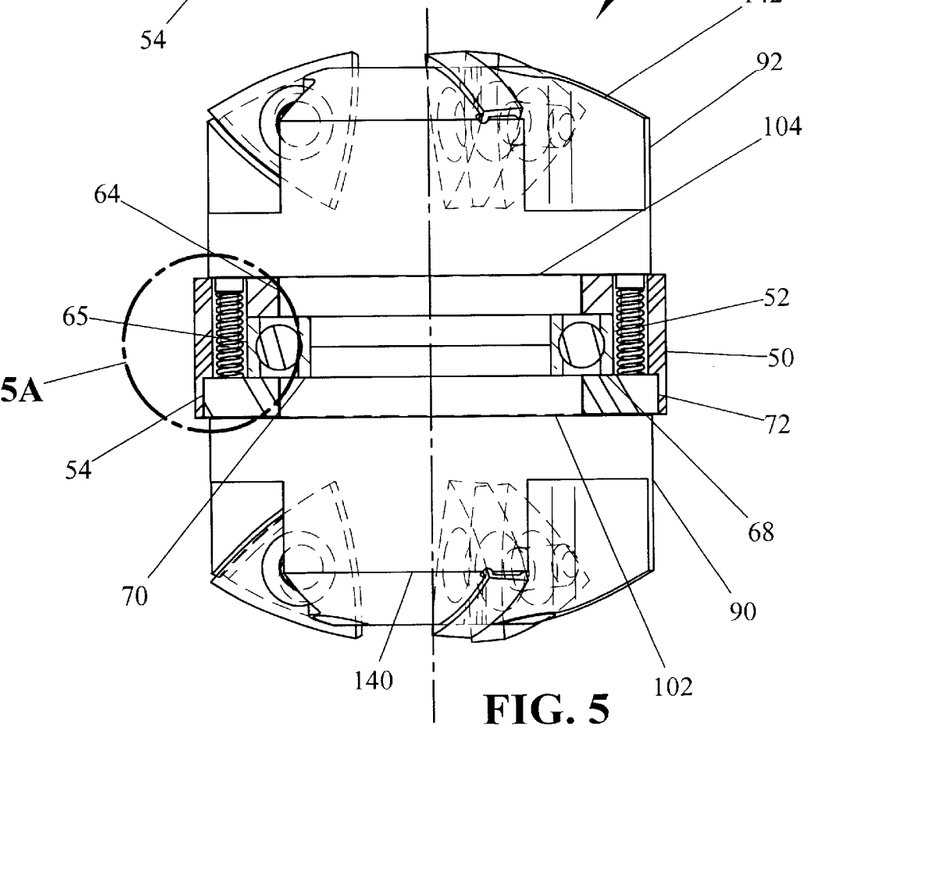
FIG. 5 is a side elevational view of the FIG. 2 tool body with its two half tool bodies assembled together, with the three indexable cutting tool inserts shown in partially in phantom to reveal their equiangularly spaced relation, and also showing in partial cross-section the precision ball bearing assembly and two opposed springloaded plunger stop assemblies located therein.
Figure 5A:
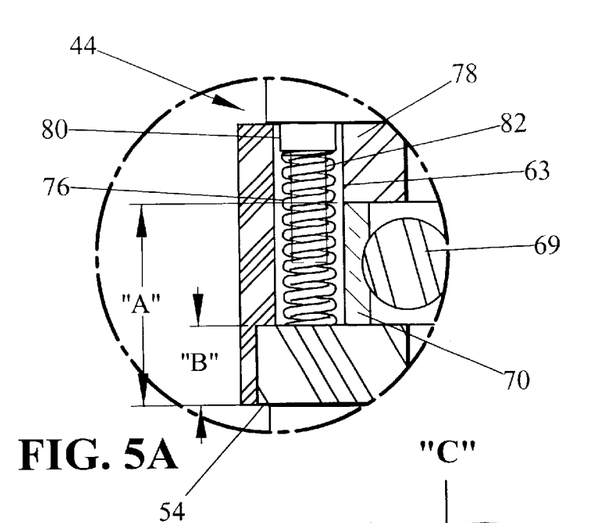
FIG. 5A is an enlarged view of the encircled area 5A in FIG. 5.

In the preferred embodiments, the spring plunger assembly 56, as best shown in FIGS. 5 and 5A, includes a small gauge wire-wrapped spring 76 and a plunger 78 having a head 80 and a shaft 82. The spring 76 is disposed over the plunger shaft 82 and engages the rear of the plunger head 80. The spring plunger assembly 56 is installed in the tool hanger body 50 and is retained by the bearing retainer plate 54. To accomplish this, the tool hanger body 50 (FIG. 4) has at least one spring plunger bore 63 machined through the upper diameter bore 72, parallel to the central axis "C", at the same radial distance as the bearing retainer holes 57. The spring plunger bore 63 is closed at one end when the bearing retainer plate 54 is secured in the tool hanger body 50. The opposite end of the spring plunger bore 63 is open to the inner face of the tool body assembly 44, which will be discussed in greater detail below, and the spring plunger assembly 56 is disposed within the spring plunger bore 63 so that the head of the plunger rides against the inner face of the tool body assembly 44.

Figure 5B:
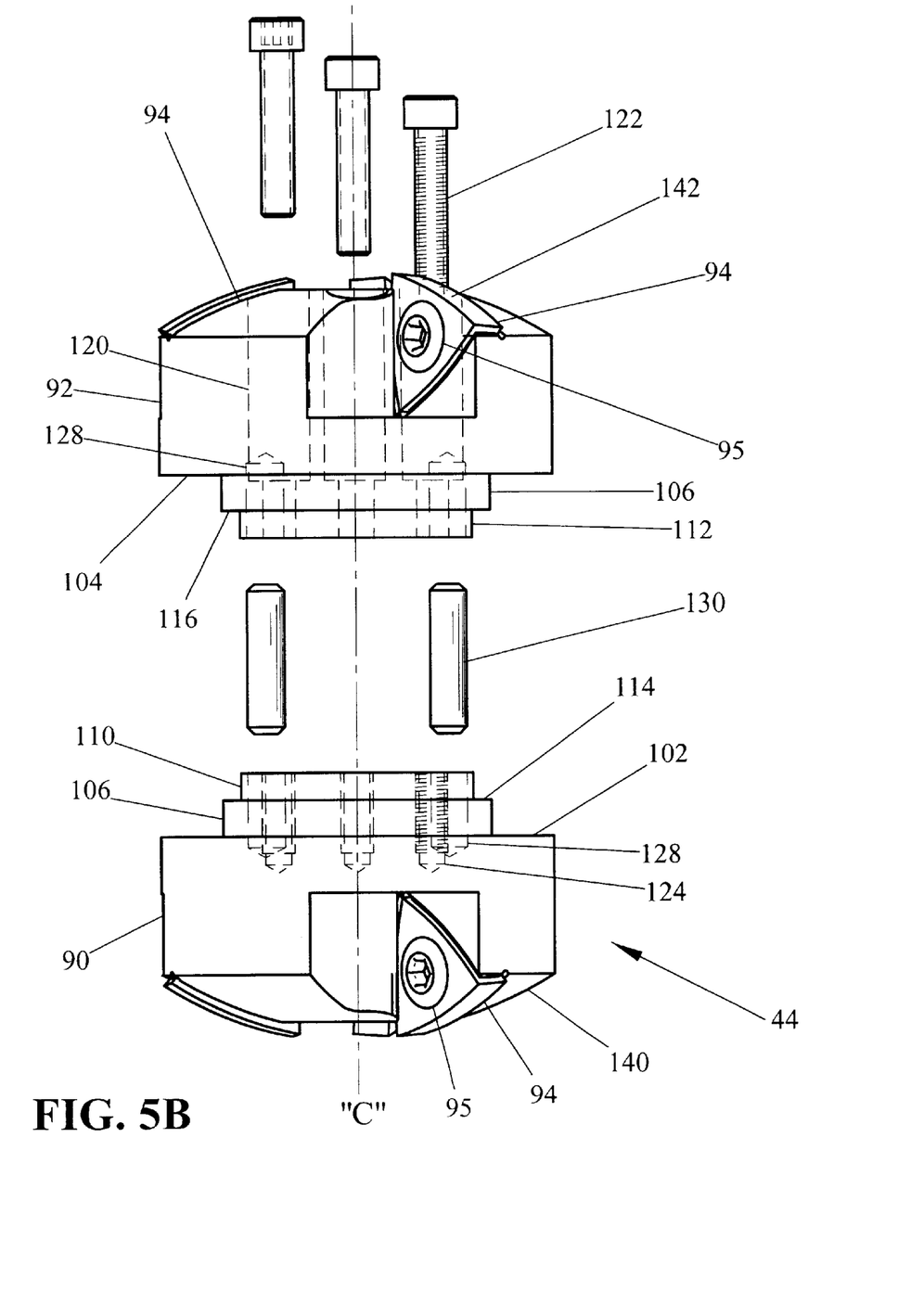
FIG. 5B is an exploded side view of the tool body assembly of FIG. 5 showing its two body halves and its locating pins and three bolts used to fasten the two body halves together.

As shown in FIG. 5B, the tool body assembly 44 includes a first or upper tool body portion 90 and a second or lower tool body portion 92, respectively having cutting faces 140 and 142, which are provided with a plurality of insert pockets 134, and a plurality of identical, indexable cutting inserts 94. In the preferred embodiments, the tool body portions 90 and 92 are each generally cylindrical as shown and have an open splined arbor bore 96 about their central axis "C". The splined arbor bore 96 within each of the tool body portions 90, 92 is formed with a plurality of internal spline teeth 98, which are adapted to engage a like plurality of complimentary spline teeth 100 provided on the splined arbor drive assembly 46.

The two tool body portions 90 and 92 are substantially mirror images of each other. The tool body portions 90 and 92 are disposed on either side of the elongated leg 62 of the tool hanger body 50 across the through-bore 60. The inner opposing faces 102 and 104 of the tool body portions 90 and 92 each have two raised or stepped concentrically positioned cylindrical sections as shown. Tool body portion 90 includes a larger proximal section 106, and a smaller diameter distal section 110, and thus defines an annular flat surface 114. Similarly, tool body portion 92 includes a larger diameter proximal section 108 and a smaller diameter distal section 112, thus defining an annular flat surface 116 that faces opposed annular surface 114, when assembled.

As the two tool body portions 90 and 92 are assembled in the through-bore 60 of the tool hanger body 50, the first, or proximal, raised section 106 of the lower tool body portion 90 fits within the lower diameter bore 64, and the first, or proximal, raised section 108 of the first tool body portion 92 fits within the inner diameter of the bearing retainer plate 54. The second, or distal, raised sections 110 and 112 of the tool body portions 90 and 92 fit within the inner race 70 of the bearing assembly 52. The second, or distal, raised sections 110 and 112 are of a particular height in relation to the first raised sections 106 and 108, so that, as the tool body portions 90 and 92 are brought together within the through bore 60, the flat annular surfaces or faces 114 and 116 of the first raised sections 106 and 108 engage and compress against the opposed cylindrical ends of the inner race 70 of the bearing assembly 52.

Each of the tool body portions 90 and 92 have a plurality of precisely positioned holes to allow a registered physical connection to occur between the portions. In the lower tool body portion 90 the holes 120 are smooth bored and countersunk so that cap screws 122 may be used to engage the tapped holes 124 of the first tool body portion 92. When the tool body portions 90, 92 are compressively joined together in this manner, they clampingly engage the opposed cylindrical ends of the inner race 70 of the bearing assembly 52. Additionally, the stepped surfaces 106 and 108 of the tool body portions 90 and 92 are slightly greater in length than the depth "B", so that when they are joined about the bearing assembly 52, the tool body portions 90 and 92 only contact the inner race 70 and are otherwise isolated from any other contact with the tool hanger body 50. As seen in FIGS. 3, 5 and 5B, the tool body portions 90 and 92 also have a plurality of precisely located registration holes 128 drilled on the opposed faces of the distal stepped sections 110 and 112 for the insertion of a plurality of locating, or registration, pins 130. These pins 130 are used to ensure that tool body portions 90 and 92 and their spline teeth 98 are precisely and correctly aligned with one another along the central axis "C".

This attachment of the tool body assembly 44 to the tool hanger 50 by way of interconnecting the tool body portions 90 and 92 to the precision bearing assembly 52 within the through-bore 60 provides the desired precision locating of the rotatable tool body assembly 44 within the tool hanger, which thereby precisely locates the cutting inserts 94 for rotation against the surfaces to be machined and finished. Accordingly, it should be understood that the tool body assembly 44 is firmly clamped to and precisely located by the inner race 70 of the bearing assembly 52, and that both assembly 44 and the inner race 70 are free to rotate about the central axis "C", while outer race 68 is firmly clamped to the tool hanger body 50 by bearing retainer plate 54.

In addition to the differences in the tool body portions 90 and 92 relating to the manner in which they are connected together, as described above, each tooth of the plurality of spline teeth 98 within the splined arbor bore 96 of the lower tool body portion 90 also includes an angled leading edge. In the preferred embodiment, this leading edge, or angled initial lead, on each of the plurality of spline teeth 98, as shown at 126, is a chamfered 45-degree lead angle, rounded in a 0.03 inch radius. This initial lead feature on the spline teeth 98 corresponds to a similar spline lead on the teeth 100 of the splined arbor drive 46, discussed in greater detail below. It should be appreciated however, by those of ordinary skill in the art, that the spline lead dimensions could vary from the preferred without departing from the scope of the invention. It should be further appreciated that if a milling procedure is to be performed that only requires one surface to be milled within the internal cavity of the workpiece that a singular tool body portion may be employed with a blank, or non-cutting portion opposing it about the tool hanger through-bore 60.

Figures 6, 6A:
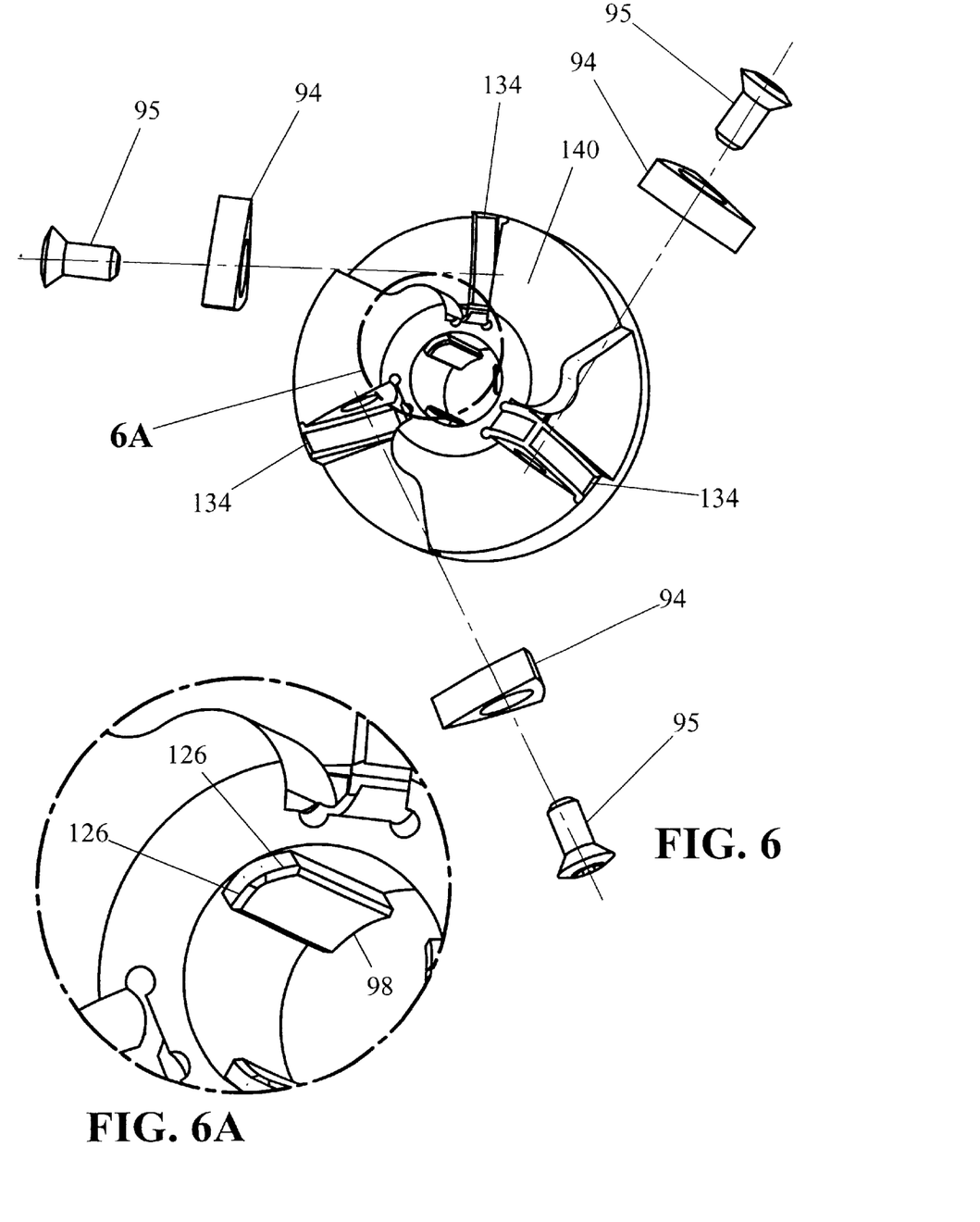
FIG. 6 is an exploded perspective view of the top of a typical body half of the FIG. 5 tool body assembly of the present invention.
FIG. 6A is an enlarged view of the encircled area 6A in FIG. 6 showing details of the spline teeth in the area of central bore in the tool body half.

The outer or cutting faces 130 of the tool body portions 90 and 92 operatively locate and retain the indexable cutting inserts 94. As shown in FIGS. 3 and 6, the outer faces 130 of the tool body portions 90,92 are machined to have a plurality of insert pockets 134, equilaterally set about the central axis "C". The insert pockets 134 are each precisely cut as to accept and retain one of a plurality of cutting inserts 94 in a specific orientation. The cutting inserts 94 are securely retained within the inserts pockets 134 by the retaining screws 95. It should be appreciated that various methods of fastening the cutting inserts 94 within the pockets 134 may be utilized as long as the fastener may be readily removed or loosened to the extent necessary to index, or change the insert as needed to maintain a sharp cutting edge.

Figure 7:
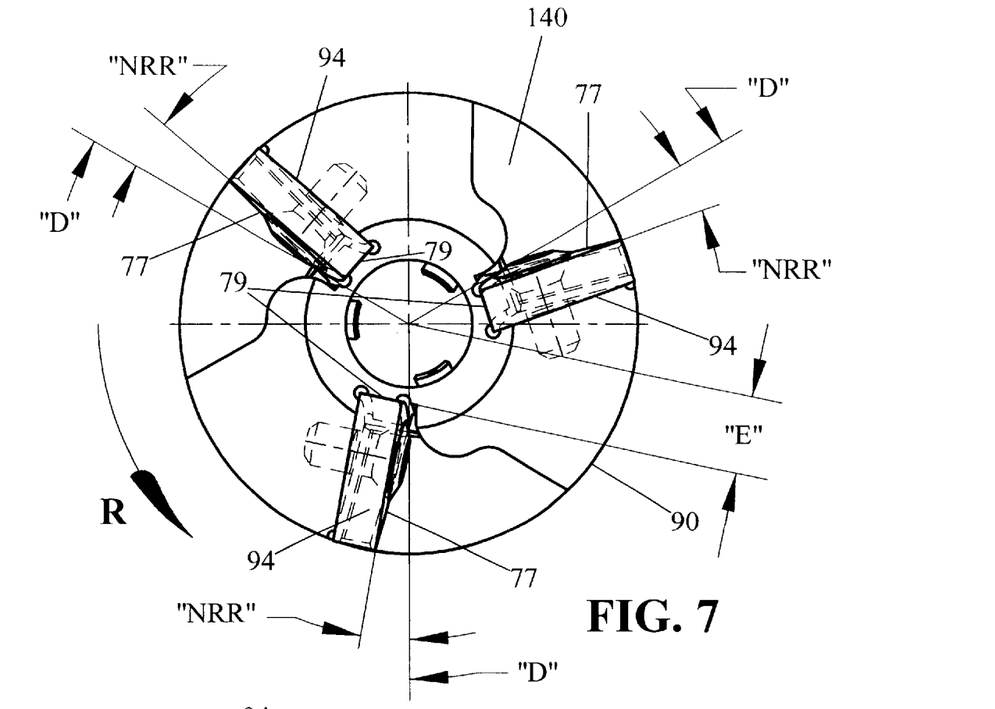
FIG. 7 is a top view of a typical body half of the FIG. 5 tool body assembly of the present invention showing the negative radial rake ("NRR") of the indexable tool inserts mounted therein.
Figure 7A:
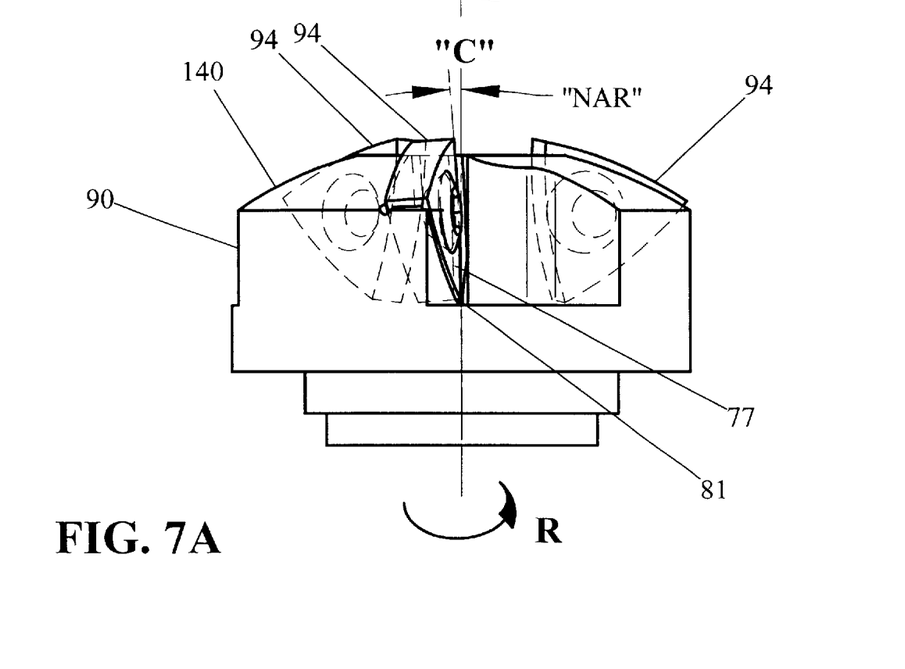
FIG. 7A is a side view of a first body half of the FIG. 2 tool body assembly of the present invention showing the negative axial rake ("NRR") of the indexable tool inserts mounted therein.

As best shown in FIGS. 7 and 7A, the cutting inserts 94 are offset in two planes and generally have a negative displacement. In the art, the two offset angles are known as the radial rake angle and the axial rake angle. In referring to the radial angle, FIG. 7 depicts the reference points. The tool body portion 90 rotates in a direction "R" about the central axis "C", which is shown from the top down as a single point. A radial plane "D" extends outwardly. It should be appreciated that the tool body portion 90 as shown in FIGS. 7 and 7A is a mirror image of tool body portion 92 and is representative of tool body portion 92 for illustration purposes in regard to the orientation of the cutting inserts 94 and the direction of rotation "R". In other words, illustrations depicting tool body portion 92, in the manner of FIGS. 7 and 7A, would merely be repetitive excepting that the direction of rotation "R" would be reversed and the cutting inserts 94 would be disposed in a reversed direction from those shown in FIG. 7 and 7A and as described in the discussion to follow.

As shown, the cutting insert 94 is located at some radial distance "E" out from the central axis "C". The cutting insert 94 is defined in this illustration by a forward face 77 and an inner radial edge 79 of this forward face that is closest to the center of the tool body portion 90. The inner radial edge 79 of the cutting insert 94 is then operatively disposed forward of and leading the remainder of the forward face 77 relative to the rotation "R". This creates the negative radial rake angle "NRR" defined by the angular difference between the forward face 77 of the cutting insert 94 and the radial plane "D".

In the preferred embodiment, the negative radial rake angle NRR is a 4-degree offset from the radial plane "D" of axis "C". This offset in negative radial rake angle "NRR" allows the inner end of the cutting insert 94 to contact the surface to be cut first, so that as the cutting insert 94 sweeps through its arc, the workpiece material shears or shaves off from the inside of the cutting area to the outside. This arrangement is used to improve the surface finish and reduce tool chatter while assisting in moving the cut shavings out away from the workpiece. As can also be seen in FIG. 7, the cutting insert 94 is disposed in the tool body portions 90 and 92 in a negative displacement with reference to the radial plane "D". The inner radial edge 79 of the cutting insert 94 is located on the radial plane "D" with the remainder of the cutting insert 94 being disposed behind, or negative to, the radial plane "D" relative to the direction of rotation "R".

In referring to the axial rake angle, FIG. 7A depicts the reference points. Again, the tool body portion 90 rotates in a direction "R" about the central axis "C", which is shown in FIG. 7A as an axial plane that extends outwardly. The cutting inserts 94 of the preferred invention have squared lateral side faces, such that the sides of the cutting insert are set at 90-degree angles to the front, rear, and end faces. In general terms, the cutting edge is actually the first forward edge defined by the intersection of the first edge of said forward face and the forward edge of the lateral side of said cutting insert closest to the workpiece. If the cutting insert 94 were left only with the negative radial rake angle "NRR" as mentioned above, its first face will remain square to the workpiece and the full first face, rather than the cutting edge will be engaged in the cutting operation. This is known as 0 (zero) axial rake and is undesirable as the greater contact surface area adds to the friction of the cut and increases the residual heat in the material and the insert, which causes distortions and tool chattering. The insert also wears quickly across its entire side face at one time, which prevents the insert from being usable when reversed. This full, first face exposure of the cutting insert to the workpiece material is a typical approach to internal cavity cutting tool construction and the present invention overcomes these drawbacks and disadvantages by adding a negative axial rake angle to the cutting insert 94.

In this regard, in addition to the first offset in negative radial rake angle NRR, the preferred embodiment includes a second offset, which is in negative axial rake angle. The preferred embodiment rotates, or reclines, the cutting insert back from a 0 degree axial position to a 4 degree negative axial rake. As seen in FIG. 7A, the cutting insert 94 is further defined by a lower axial edge 81 of the forward face 77 that is farthest from said cutting face 140 of the tool body portion 90. The lower axial edge 81 of the cutting insert 94 is then operatively disposed forward of and leading the remainder of the forward face 77 relative to the rotation "R". This creates the negative axial rake angle "NAR" defined by the angular difference between the forward face 77 of the cutting insert 94 and the axial plane that extends from the central axis "C". This negative axial rake angle "NAR" exposes only the first forward edge of the cutting insert 94 to the cutting process and removes the full upperface, thereby doubling the available cutting surfaces of the insert 94 by allowing it to be reversed as well as rotated when indexed.

Additionally, the cutting insert 94 is disposed within the tool body assembly in a negative displacement in reference to an axial plane as well. As shown in FIG. 7A, the lower forward edge of said cutting insert 94 is located on the axial plane extending from the central axis "C" with remainder of cutting insert 94 disposed behind, or negative to, the axial plane "C" relative to the direction of rotation "R".

As shown in FIGS. 2 through 7A, the cutting inserts 94 and tool body assembly 44 are designed to perform a spherical seat cut. This is due to the inserts 94 having forward and rear faces concomitantly formed in the shape of an equilateral triangle having outwardly curved sides with squared lateral sides disposed between the forward and rear faces. This design provides an indexable cutting insert having six curved-edge cutting surfaces to thereby produce a spherical seat cut with the desired arcuate shape within a workpiece.

Figure 8:
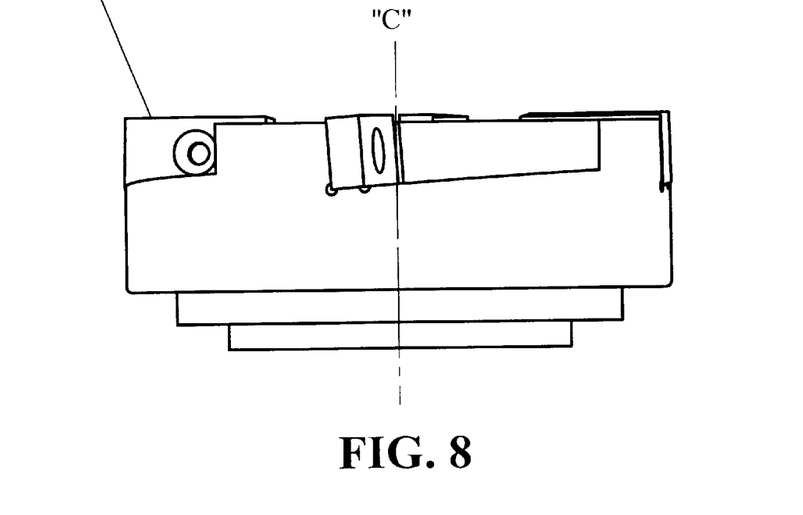
FIGS. 8 and 8A are side and top views of one half body portion of another internal cavity cutting tool assembly of the present invention, that is constructed like the first embodiment, except that it has four equiangularly spaced indexable cutting inserts positioned in insert pockets and is arranged to machine an annular ring within an internal cavity of a workpiece.
Figure 8A:
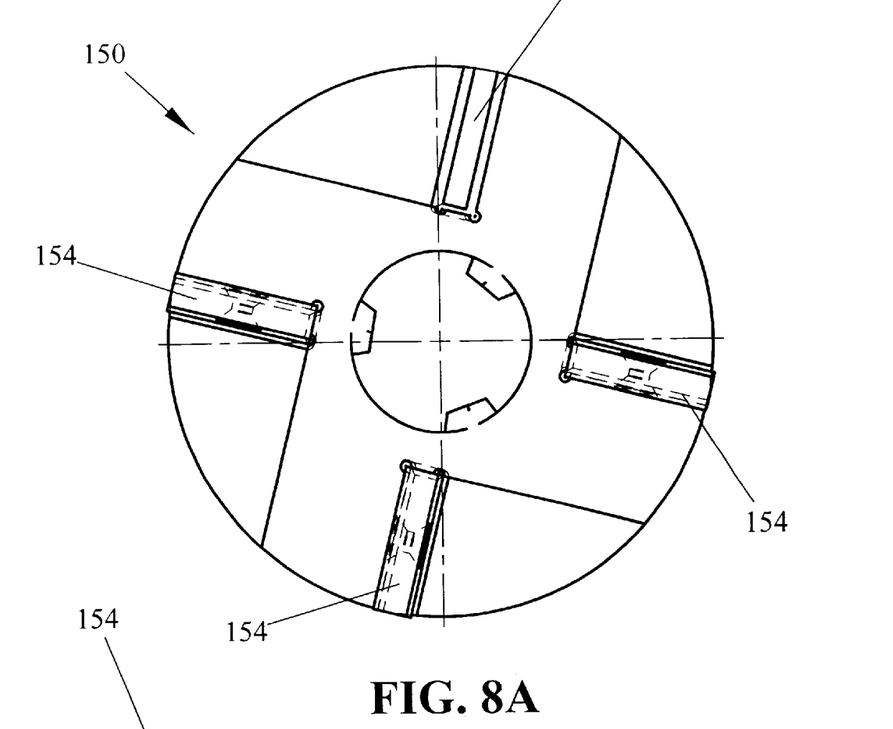

It should be appreciated by those of ordinary skill in the art that other embodiments of the present invention, are possible which utilize cutting inserts of different shapes known in the art, in order to produce different types of internal cuts within a workpiece. In other words, the use of inserts of different shapes in the tool body assembly disclosed herein to produce seats or surfaces having different geometries other than spherical seats is within the broader scope and the spirit of the present invention. For example, an additional, non-limiting embodiment of the tool body of the present invention is depicted in FIGS. 8 and 8A. In this embodiment, the tool body 150, the cutting insert pockets 152 and the cutting inserts 154 are constructed in a manner to produce a flat surface as an angular ring within an internal cavity of a workpiece. The embodiment of FIGS. 8 and 8A also retains the rake angle features of the present invention and have negative axial and radial rakes as described above.

Additionally, one or more of the plurality of the cutting insert pockets on the tool body assembly may be constructed to hold a chamfering insert, such that both the cutting of the work surface and a chamfering operation could be perform simultaneously. It should be further appreciated that the tool body assembly may also be constructed as to perform not only one, or two, but several combined milling operations at one time depending upon the desired result. For example, additional chamfering bits, multiple angled bits, or separate bits cutting multiple angles may be selectively combined upon and within the tool body assembly.

To operatively drive the tool 10, as shown in FIG. 2, the splined arbor drive assembly 46 is formed as a splined arbor drive shaft 148 and an arbor support 141. The splined arbor drive shaft 148 is operatively attached to a some type of milling machine (not shown) by its drive end 136 and its support end 138 is inserted into the workpiece, through the tool body assembly 44, out of the workpiece, and into the arbor support 141, which is also configured in known manner to meet the attachment requirements of the milling machine. The splined arbor drive shaft 148 is constructed on its drive end 136 to engage the particular mechanism used by the milling machine to provide the rotational motive power to the internal cavity cutting tool 40, thereby rotatively driving the tool body assembly 44 and the cutting inserts 94 mounted therein.

The splined portion 143 of the splined arbor drive shaft 148 has a plurality of spline teeth 100, which as previously discussed, are complementary to the spline teeth 98 of the tool body assembly 44. The arbor spline teeth 100 also have a corresponding spline leads 144, shown in FIG. 2A, substantially the same as the spline leads 126 on the lower tool body portion 90. The two sets of spline leads 126 and 144 allow an automated engagement of the splined arbor drive shaft 148 to the tool body assembly 40 as any rotational offset between the tool body assembly 40 and the splined arbor drive 46 is automatically corrected for by the ramping action of the spline leads 126, 144 as they engage each other. In this manner, the engagement of the spline arbor drive shaft 148 to the tool body assembly 44 is a positive engagement rotatively, yet allows for a slidable lateral movement of the tool body assembly 44 along the splines of the arbor drive shaft 148.

In operation, the workpiece 10 is placed in a milling machine and precisely located. The tool hanger 42, having the desired cutting inserts 94 to produce the surface to be machined is inserted within an internal cavity of the workpiece. The splined arbor drive shaft 148 is inserted though an opening in the workpiece to engage the splines of the tool body assembly 44. As the splines 126 and 144 register together, the arbor support 141 is brought out through the opposite side of the workpiece to engage the support end 138 of the shaft 148. The splined arbor drive 46 is then rotated by the milling machine to spin the tool body assembly 44 and its cutting inserts 94. By a known pre-programmed procedure, the tool hanger 42, and thus, the tool body assembly 44, is moved laterally along the splines of the splined arbor drive shaft 148 by the milling machine to engage the surfaces of the workpiece to be machined. If the internal cavity cutting tool 40 has upper and lower tool body portions 90 and 92, in order to cut upper and lower seat areas within the workpiece 10, the tool hanger will be moved laterally along the splines in both directions. When the operation is completed, disassembly takes place. The arbor support 138 is first withdrawn, followed by the splined arbor drive shaft 148 and finally the tool hanger 42. The workpiece 10 can then be removed from the milling machine or another procedure can be performed on it.

As note above, the splined arbor drive assembly 46 must cyclically withdraw from, then reconnect with, the tool body assembly 44 each time a finished workpiece is removed from, and a new workpiece is introduced to, this stage of the milling process. Accordingly, it would be advantageous to have the splined arbor drive 46 maintain its alignment with the tool body assembly 44, so as to minimize the need for the spline teeth 98 of the tool assembly 44 to be moved upon re-engagement with the spline teeth 100 of the arbor drive shaft 148. To facilitate the maintenance of the position of the spline teeth 98, the spring plunger assembly 56 is provided. It assists in maintaining the relative location of the tool body assembly 44 with respect to the splined arbor drive shaft 148 as the shaft 148 is withdrawn. The spring plunger assembly 56 does this by functioning as a friction stop to prevent the tool body assembly 44 from continuing to spin, or freewheel, when the splined arbor drive shaft 148 is disengaged.

Specifically, the spring 76 provides a biasing force against the plunger head 80 to cause it to lightly bear against one of the inner faces 102 and 104 of the tool body portions 90 and 92. In the preferred embodiment of springer plunger assembly 56, the plunger 78 is of a nylon construction, and the biasing pressure of the spring is selected to be just enough to prevent the tool body assembly 44 from spinning freely while allowing the nylon head 80 to slide on the tool body assembly 44 with minimal drag and little frictional loss during the milling operation. In this manner, the spring plunger assembly 56 holds the tool body assembly 44 in position as the splined arbor drive shaft 148 is withdrawn, thus allowing the splined arbor drive 46 to cleanly relocate back into the splines 98 of the tool body assembly 44 as the next workpiece is brought into the milling machine and the arbor engages the tool.

Epilogue. While the foregoing embodiments have been described with respect to the indexable inserts having a plurality of identical cutting edges, in its broader aspects, the internal cavity cutting tool assemblies of the present invention with their ultra-stable rigid hanger tool supports and tool bodies riding on precision ball bearings may be used with non-indexable cutting inserts. For example, a cutting tools with only one cutting edge or face may be used by providing an appropriate mounting cavity or other insert-holding arrangement of conventional or suitable design. Further, although indexable cutting inserts that are positioned as shown and described so as to have a negative axial rake and negative radial rake are preferred, in its broader aspects, my invention with its first and second body portions may be constructed to present the indexable cutter inserts other orientations if desired. In other words, although such other arrangements are not presently preferred, they nonetheless can be expected to benefit from the tool assembly of the present invention with its ultra-stable rigid hanger tool support and its two-part tool body clamped to the inner race of a precision ball bearing assembly.

Accordingly, the broader aspects of the invention as claimed below should be understood to apply to all possible alternative structures of the present invention that are encompassed by the claim language. In other words, although a number of other possible modifications have already been described above, further changes are clearly possible within the scope of the present invention. For example, different features, variations and aspects mentioned with respect to one embodiment may be combined with another embodiment to provide a tool assembly having a certain combination of the desired features as described herein. Thus, it is to be understood that the present invention is by no means limited to the particular constructions herein disclosed and/or shown in the drawings. Instead, the present invention also encompasses any modifications or equivalents within the scope of the disclosures that are fairly covered by the claims set forth below.

I claim:

1. An internal cavity cutting tool assembly comprising:
   a tool hanger assembly including a tool hanger body, a bearing assembly, and bearing retainer means, the tool hanger body having an elongated leg with a first surface and a second surface, the elongated leg having a though-bore disposed through the first and second surfaces, the though-bore further having a bearing seat, the bearing seat adapted to receive the bearing assembly, the tool hanger body adapted to receive the bearing retainer means thereby retaining the bearing assembly at least substantially within the through-bore of the tool hanger body;
   a tool body assembly including a plurality of cutting inserts, a first tool body portion and a second tool body portion, the first and the second tool body portions each having a bearing support surface, a splined bore for receiving a splined arbor, a cutting face having a plurality of insert pockets each being arranged for receiving and supporting one of the plurality of cutting inserts, the bearing support surface of the first tool body portion adapted to be received by the end of the though-bore in the first surface of the tool hanger body and the bearing support surface of the second tool body portion adapted to be received by the end of the through-bore in the second surface of the tool hanger body, such that the bearing support surfaces oppose each other within the through-bore of the tool hanger body; and
   a splined arbor drive assembly having a splined arbor drive shaft and an arbor support, the splined arbor drive shaft being constructed to be operatively inserted through openings in a workpiece and through the splined bore of the tool body portions and into the arbor support, the splined arbor drive shaft adapted to be driven so as to operatively rotate the splined arbor drive assembly and the tool body assembly, thereby sweeping the cutting inserts disposed in the tool body portions against the portions of the workpiece to be cut,
   and further including means for preventing rotation of the tool body portions when the splined arbor drive assembly is disengaged from the tool body portions.

2. An internal cavity cutting tool assembly as set forth in claim 1 wherein:
   the bearing support surfaces of the first and second body portions are each arranged to have a stepped radial portion, and
   the bearing assembly is a sealed precision ball bearing assembly having an inner race, an outer race, and a plurality of ball bearings captured between the inner and outer races, thereby enabling relative concentric rotation to occur between the inner and outer races.

3. An internal cavity cutting tool assembly as set forth in claim 2 wherein the bearing retainer means include the bearing seat of the tool hanger body and a bearing retainer plate operatively arranged to clampingly retain the bearing assembly by the outer race, such that the inner race is unrestrained and free to rotate within the through-bore of the tool hanger body.

4. An internal cavity cutting tool assembly as set forth in claim 3 wherein the tool body portions are disposed in opposition to and abut each other within the through-bore of the tool hanger body and are joined together such that the bearing support surfaces of the first tool body portion and second tool body portion are clampingly engaged to the inner race of the bearing assembly, thereby causing the tool body portions to be rotatively disposed upon the tool hanger body.

5. An internal cavity cutting tool assembly as set forth in claim 1 wherein
the bearing retainer means includes a bearing retainer plate and wherein the means for preventing rotation of the tool body portions includes:
at least one minor bore in the tool hanger body for receiving a spring plunger assembly, the at least one minor bore being arranged in the tool hanger body along an axis parallel to the through-bore of the tool hanger body such that the at least one minor bore for the spring plunger assembly is closed off at one end by the bearing retainer plate when the bearing retainer plate is assembled upon the tool hanger body, and
a plunger assembly having at least one spring plunger assembly disposed in the at least one minor bore.

6. An internal cavity cutting tool assembly as set forth in claim 5 wherein:
the at least one spring plunger assembly includes a spring and plunger having a shaft and head provided with front and back surfaces, the spring disposed about the shaft such that one end of the spring is in contact with the back surface of the head and the other end of the spring is in contact with the bearing retainer plate when the at least one spring plunger assembly is disposed within and the bearing retainer plate is operatively disposed upon the tool hanger body, and
the front surface of the head of the plunger is adapted to be in sliding contact with the tool body assembly and provides a frictional drag to rotation of the tool body assembly, whereby the tool assembly will be free to rotate when driven by the splined arbor drive shaft and will be held in place by the at least one spring plunger assembly when the splined arbor assembly is withdrawn from the tool body assembly.

7. An internal cavity cutting tool assembly as set forth in claim 1 wherein the tool hanger body is made from a metallic composition having at least one metal alloy selected from the group of metal alloys comprising 4140 steel, 4150 steel, and 8120 steel.

8. An internal cavity cutting tool assembly as set forth in claim 1 wherein the splined bores in the first and second tool body portions each include a plurality of spline teeth, each of the plurality of spline teeth having a chamfered and rounded initial lead, the leads having an angle of about 45 degrees.

9. An internal cavity cutting tool assembly as set forth in claim 1 wherein the splined arbor drive shaft includes a plurality of spline teeth, each of the plurality of spline teeth having a chamfered and rounded initial lead, the leads having an angle of about 45 degrees.

10. An internal cavity cutting tool assembly as set forth in claim 1 wherein each of the plurality of cutting inserts are disposed within the tool body assembly at a negative radial rake angle, each of the plurality of cutting inserts being further defined by having a forward face relative to the direction of the tool body rotation and an inner radial edge of the forward face that is closest to the center of the tool body assembly, the negative radial rake angle defined by the inner radial edge of the forward face of the cutting insert being operatively disposed forward of and leading the remainder of the forward face of the cutting insert relative to the rotation of the tool body assembly and to a radial plane extending from the center of the tool body assembly.

11. An internal cavity cutting tool assembly as set forth in claim 10 wherein each of the plurality of cutting inserts are disposed within the tool body assembly with a negative displacement in the radial plane, the negative radial displacement defined by the inner radial edge of the forward face of the cutting insert being operatively disposed on the radial plane extending outwardly from the central axis with the remainder of the cutting insert disposed behind the radial plane relative to the direction of rotation of the tool body assembly.

12. An internal cavity cutting tool assembly as set forth in claim 11 wherein each of the plurality of cutting inserts is disposed within the tool body assembly at a negative axial rake angle, each of the plurality of the cutting inserts being further defined by having a forward face relative to the direction of the tool body rotation and a lower axial edge of the forward face that is farthest from the cutting face of the tool body assembly, the negative axial rake angle defined by the lower axial edge of the forward face of the cutting insert being operatively disposed forward of and leading the remainder of the forward face of the cutting insert relative to the rotation of the tool body assembly and to an axial plane extending from the central axis of the tool body assembly.

13. An internal cavity cutting tool assembly as set forth in claim 12 wherein each of the plurality of cutting inserts are disposed within the tool body assembly with a negative displacement in the axial plane, the negative axial displacement defined by the lower axial edge of the of the forward face of the cutting insert being operatively disposed on the axial plane extending outwardly from the central axis with the remainder of the cutting insert disposed behind the axial plane relative to the direction of rotation of the tool body assembly.

14. An internal cavity cutting tool assembly as set forth in claim 10 wherein each of the plurality of cutting inserts are further defined by forward and rear faces concomitantly formed in the shape of an equilateral triangle having outwardly curved edges with squared lateral sides disposed between the forward and rearfaces providing an indexable cutting insert having six curved edge cutting surfaces to thereby produce a spherical seat cut within a workpiece.

15. An internal cavity cutting tool assembly as set forth in claim 1 wherein each of the plurality of cutting inserts is disposed within the tool body assembly at a negative axial rake angle, each of the plurality of the cutting inserts being further defined by having a forward face relative to the direction of the tool body rotation and a lower axial edge of the forward face that is farthest from the cutting face of the tool body assembly, the negative axial rake angle defined by the lower axial edge of the forward face of the cutting insert being operatively disposed forward of and leading the remainder of the forward face of the cutting insert relative to the rotation of the tool body assembly and to an axial plane extending from the central axis of the tool body assembly.

16. An internal cavity cutting tool assembly as set forth in claim 15 wherein each of the plurality of cutting inserts are disposed within the tool body assembly with a negative displacement in the axial plane, the negative axial displacement defined by the lower axial edge of the forward face of the cutting insert being operatively disposed on the axial plane extending outwardly from the central axis with the remainder of the cutting insert disposed behind the axial plane relative to the direction of rotation of the tool body assembly.

17. An internal cavity cutting tool assembly comprising:
a tool hanger assembly including a tool hanger body, a bearing assembly, and a bearing retainer plate, the tool hanger body having an elongated leg and further defined by a first surface and a second surface generally opposed to the first surface, the elongated leg having a through-bore disposed through the first and second surfaces, the through-bore further having a bearing seat, the bearing seat adapted to receive the bearing assembly, the tool hanger body adapted to receive the bearing retainer plate thereby retaining the bearing assembly within the through-bore of the tool hanger body;

a tool body assembly including a first tool body portion and a second tool body portion, the first and the second tool body portions each having a splined bore, a cutting face having a plurality of insert pockets, a plurality of curved-edge cuffing inserts, and a stepped radial portion defined by a bearing support surface, the bearing support surface of the first tool body portion adapted to be received by the end of the through-bore in the first surface of the tool hanger body and the bearing support surface of the second tool body portion adapted to be received by the end of the through-bore in the second surface of the tool hanger body, such that the bearing support surfaces of the tool body portions oppose each other within the through-bore of the tool hanger body, each of the plurality of insert pockets disposed within the tool body portions adapted to receive one of the plurality of curved-edge cutting inserts; and a splined arbor drive assembly having a splined arbor drive shaft and an arbor support, the splined arbor drive shaft is operatively inserted though openings in a workpiece and through the splined bore of the tool body portions into the arbor support, the splined arbor drive shaft and the arbor support adapted to be retained in a device to operatively rotate the splined arbor drive assembly and the tool body assembly while precisely locating the tool hanger assembly within an internal cavity of the workpiece and sweeping the curved-edge cutting inserts disposed in the tool body portions against the portions of the workpiece to be cut, thereby producing at least one spherically cut surface within the workpiece, and further including means for preventing rotation of the tool body portions when the splined arbor drive assembly is disengaged from the tool body portions.

18. An internal cavity cutting tool assembly as set forth in claim 17 wherein the bearing assembly is of a known type of sealed precision ball bearing assembly having an inner race and an outer race operatively separated by a plurality of captured ball bearings, the bearing seat of the tool hanger body and the bearing retainer plate clampingly retain the bearing assembly by the outer race, such that the inner race is unrestrained and free to rotate within the through-bore of the tool hanger body, the tool body portions being disposed in opposition to each other within the through-bore of the tool hanger body are joined together in a known manner such that the bearing support surfaces of the first tool body portion and lower tool body portion are clampingly engaged to the inner race of the bearing assembly thereby causing the tool body portions to be rotatively disposed upon the tool hanger body.

19. An internal cavity cutting tool assembly as set forth in claim 17, the means for preventing rotation of the tool body portions including:

at least one spring plunger bore in the tool hanger body and at least one spring plunger assembly, the at least one spring plunger bore defined by a bore cut through the tool hanger body along an axis parallel to the through-bore of the tool hanger body such that the at least one spring plunger bore is closed off at one end by the bearing retainer plate when the bearing retainer plate is assembled upon the tool hanger body, the at least one spring plunger assembly disposed in the at least one spring plunger bore, the at least one spring plunger assembly including a plunger having a head, a shaft, and a spring, the spring disposed about the shaft, the head of the plunger adapted to slidingly contact the tool body assembly thereby providing a frictional drag to rotation of the tool body assembly such that the tool body assembly will be held in place by the at least one spring plunger assembly when the splined arbor assembly is withdrawn from the tool body assembly.

* * * * *